United States Patent
Miyoshi et al.

(10) Patent No.: US 9,955,124 B2
(45) Date of Patent: Apr. 24, 2018

(54) SENSOR PLACEMENT DETERMINATION DEVICE AND SENSOR PLACEMENT DETERMINATION METHOD

(71) Applicant: Hitachi, Ltd., Chiyoda-ku, Tokyo (JP)

(72) Inventors: Masanori Miyoshi, Tokyo (JP); Manabu Katou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 184 days.

(21) Appl. No.: 14/899,834

(22) PCT Filed: Jun. 21, 2013

(86) PCT No.: PCT/JP2013/067047
§ 371 (c)(1),
(2) Date: Dec. 18, 2015

(87) PCT Pub. No.: WO2014/203389
PCT Pub. Date: Dec. 24, 2014

(65) Prior Publication Data
US 2016/0142679 A1    May 19, 2016

(51) Int. Cl.
*H04N 7/18* (2006.01)
*G06K 9/00* (2006.01)

(52) U.S. Cl.
CPC ......... *H04N 7/181* (2013.01); *G06K 9/00778* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 2009/0009317 A1* | 1/2009 | Weaver | G06Q 10/06 340/517 |
| 2013/0090904 A1* | 4/2013 | Gupta | G08G 1/0108 703/6 |

FOREIGN PATENT DOCUMENTS

| | | |
|---|---|---|
| JP | 2007-264706 A | 10/2007 |
| JP | 2011-195290 A | 10/2011 |
| JP | 2012-10210 A | 1/2012 |

OTHER PUBLICATIONS

International Search Report (PCT/ISA/210) issued in counterpart International Application No. PCT/JP2013/067047 dated Aug. 20, 2013, with English translation (Five (5) pages).

(Continued)

*Primary Examiner* — Kevin McInnish
(74) *Attorney, Agent, or Firm* — Crowell & Morning LLP

(57) ABSTRACT

This sensor placement determination device is provided with an external storage device (15) in which traffic data, i.e. the actual paths taken by people, is recorded in a planned target area in which sensors are to be arranged, a traffic simulation observation unit (100) which, for candidate arrangement positions of the sensors in the target area, generates, on the basis of the traffic data, information about the passage of people through the monitoring area of the sensors, a traffic estimation unit (102) which, with the passage information as a constraining condition, generates candidate paths by which people might pass through the target area, an estimated error calculation unit (104) which, for the traffic through the monitoring area of the sensors, calculates an estimated error between the number of people passing along the candidate paths and the number of people passing along the actual paths, and an additional camera determination unit (106) which determines a sensor arrangement position that minimizes the calculated estimated traffic error.

8 Claims, 14 Drawing Sheets

(56) References Cited

OTHER PUBLICATIONS

Japanese language Written Opinion (PCT/ISA/237) issued in counterpart International Application No. PCT/JP2013/067047 dated Aug. 20, 2013 (Three (3) pages).
"Fundamental Study on Data Assimilation to Estimate People Flow in a Railway Station", (master's thesis, Tokyo University), 2011, (Thirty-nine (39) pages).

* cited by examiner

SENSOR PLACEMENT DETERMINATION DEVICE AND SENSOR PLACEMENT DETERMINATION METHOD

TECHNICAL FIELD

The present invention relates to a sensor placement determination device and a sensor placement determination method, which determine a placement position of a sensor such as a camera for measuring traffic.

BACKGROUND ART

Need for traffic measurement with sensors such as cameras has been increasing. For example, to grasp congestion inside a station and the like, traffic measurement with cameras is performed. Further, for measurements to reduce congestion in sales floors in department stores and the like, the traffic measurement may be required. At this time, a necessary minimum number of cameras to be installed is required due to restrictions on equipment cost.

PTL 1 describes a method of automatically creating camera placement that satisfies a customer request, and assisting determination of the camera placement, based on the customer request including a monitoring layout.

Further, NPL 1 describes a method of making an estimated error of traffic generated by simulation small based on measurement data of partial traffic.

CITATION LIST

Patent Literature

PTL 1: Japanese Patent Application Laid-Open No. 2012-10210

Non-Patent Literature

NPL 1: Fundamental Study on Data Assimilation to Estimate People Flow in a Railway Station (master's thesis, Tokyo University, 2011)

SUMMARY OF INVENTION

Technical Problem

The technology of PTL 1 focuses on functions of the cameras such as motion detection and face detection, as the customer request including a monitoring layout, and integrates the cameras that are required to have similar functions. However, the technology of PTL 1 is not intended to target the traffic.

Further, the technology of NPL 1 is intended to perform traffic measurement and makes an estimated error of the traffic small. However, the technology of NPL 1 is not intended to determine camera positions where the traffic can be accurately measured.

The present invention is an invention for solving the above-described problems, and an objective is to provide a sensor placement determination device and a sensor placement determination method, which can evaluate a placement position of a sensor in terms of measurement accuracy of traffic and determine the placement position of the sensor suitable for traffic measurement.

Solution to Problem

To achieve the objective, a sensor placement determination device of the present invention includes storage means (for example, an external storage device 15) configured to store, about a target area (for example, a target area 300) where a plurality of sensors (for example, a camera 314) that observes traffic is to be placed, traffic data (for example, a record 62) that is an actual path (for example, a path 307) of when a person actually passes through the target area, traffic simulation measurement means (for example, a traffic simulation observation unit 100) configured to simulatively generate observation information of the person observed with each of the sensors, when the plurality of sensors is placed, based on the traffic data, in candidates of placement positions of the plurality of sensors in the target area, traffic estimation means (for example, a traffic estimation unit 102) configured to estimate and generate a candidate path (for example, candidate paths 702 and 704) indicating how the person passes through the target area, using the observation information generated by the traffic simulation measurement means as a constraining condition, estimated error calculation means (for example, an estimated error calculation unit 104) configured to compare the number of observed people of each candidate of the placement positions of the sensors calculated based on the candidate path generated by the traffic estimation means and the number of observed people of each candidate of the placement positions of the sensors calculated based on the traffic data, and calculate an estimated error of when the traffic estimation means estimates the candidate path, and sensor position determination means (for example, an additional camera determination unit 106) configured to select the candidate as the placement position of the sensor where the estimated error calculated by the estimated error calculation means becomes small, for the candidates of the placement positions of the plurality of sensors, and determines the placement position.

Advantageous Effects of Invention

According to the present invention, a placement position of a sensor can be evaluated in terms of measurement accuracy of traffic, and the placement position of the sensor suitable for traffic measurement can be determined.

DESCRIPTION OF EMBODIMENTS

Embodiments of a sensor placement determination device according to the present invention will be described in detail with reference to the drawings. Note that, in the present embodiment, an example of using a camera as a sensor that measures traffic will be described. A sensor that can measure the traffic such as a line sensor or a laser sensor may be used other than the camera. Note that the sensor detects passage of people and passing directions.

Figure 1:
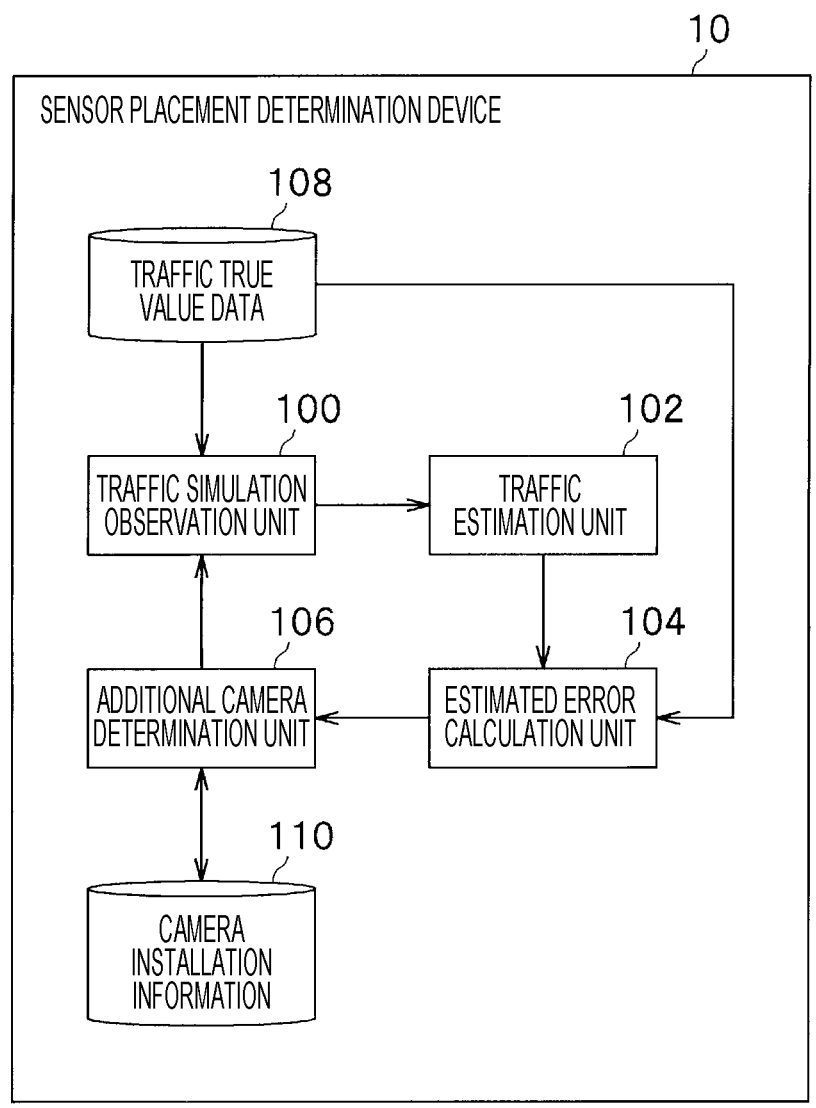
FIG. 1 is a diagram illustrating an overall configuration of a sensor placement determination device of the present invention.

FIG. 1 is a diagram illustrating an overall configuration of a sensor placement determination device of the present invention. Functional configurations of a sensor placement determination device 10 will be described with reference to FIG. 1. The sensor placement determination device 10 is configured from a traffic simulation observation unit 100 (traffic simulation measurement means, see FIG. 5), a traffic estimation unit 102 (traffic estimation means, see FIGS. 6 and 7), an estimated error calculation unit 104 (estimated error calculation means, see FIG. 8), and an additional camera determination unit 106 (sensor position determination means, see FIG. 10).

The traffic simulation observation unit 100 simulatively generates passage information of a person, that is, flow information (for example, flow information 502 illustrated in FIG. 5), which is generated when traffic true value data 108 is observed in a virtual camera position determined by the additional camera determination unit 106 described below (for example, an observation position with a camera 314 illustrated in FIG. 5).

The flow information is local information obtained when the traffic true value data 108 as global information is observed with discretely placed cameras, and here is information of the number of people passing in a field of view of the cameras. Details will be described with reference to FIG. 5.

Here, the traffic true value data 108 means a data set that includes a plurality of traffic data (a moving path) serving as a reference when an estimated error of traffic is evaluated. The traffic data is indicated with a set of points of a path that indicates a route of one person actually moving inside buildings and on streets. Note that a value data means a correct value actually measured.

The traffic data is, as described above, a set of points of a path obtained by tracking a person, and may just be measured using a laser scanner, for example. The laser scanner is a device that acquires three-dimensional coordinate data of peripheral objects, using a time until an irradiated laser is reflected at the objects and returned. The traffic true value data 108 may be measured by detecting and tracking the person from videos of a large number of video cameras, other than the laser scanner. The traffic true value data 108 may be manually created. Further, the traffic data may be created by traffic simulation. Note that a method of acquiring the traffic data will be described with reference to FIGS. 12 to 14.

The traffic estimation unit 102 generates the traffic data that favorably satisfies an occurrence condition of the flow information generated by the traffic simulation observation unit 100, by agent simulation described below.

The estimated error calculation unit 104 compares the traffic data estimated by the traffic estimation unit 102 and the traffic true value data 108 and calculates an estimated error.

The additional camera determination unit 106 determines a placement position (installation position) of a camera to be newly added to a camera group, installation of which has been determined by camera installation information, such that the estimated error of traffic calculated by the estimated error calculation unit 104 is minimized, and stores a result in camera installation information 110.

Figure 11:
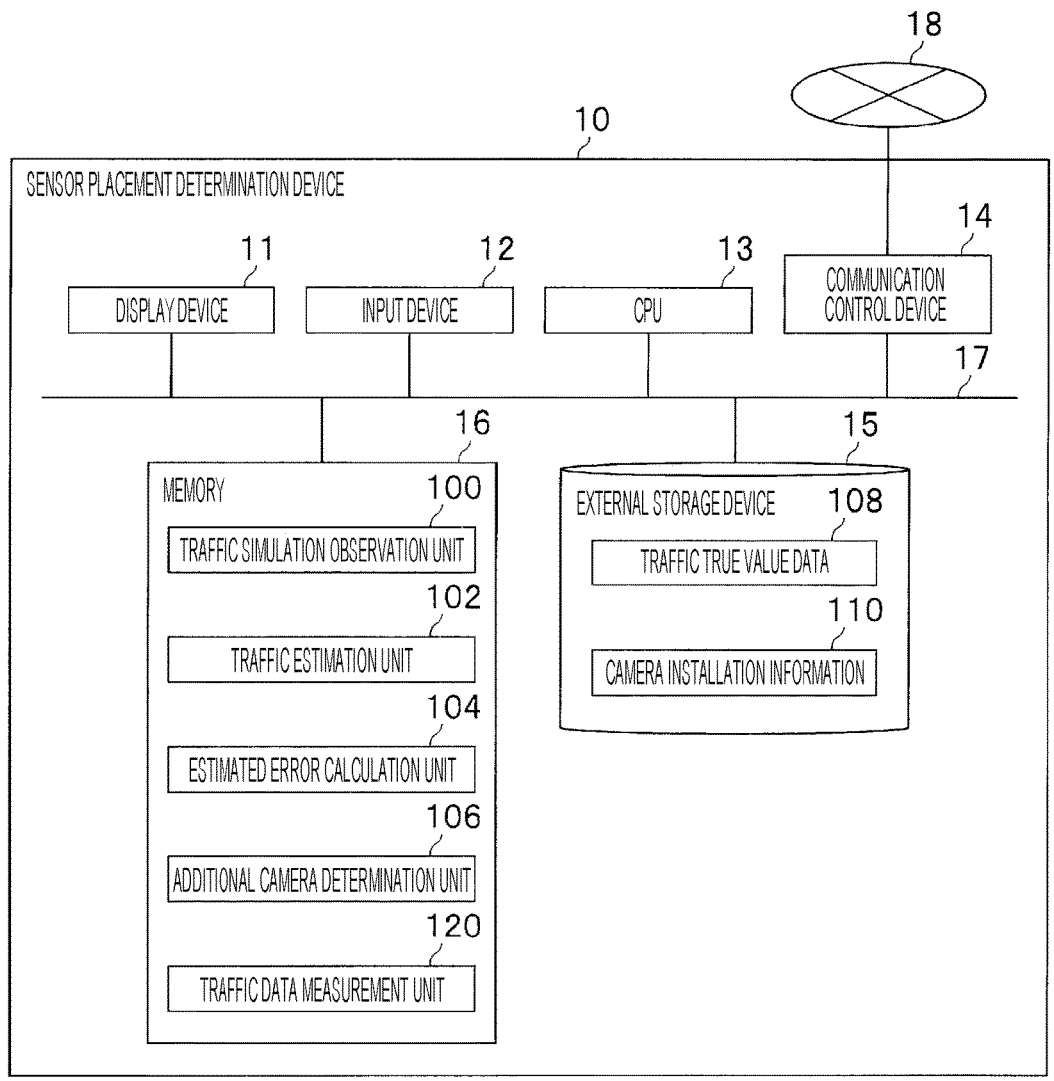
FIG. 11 is a diagram illustrating a hardware configuration of the sensor placement determination device.

FIG. 11 is a diagram illustrating a hardware configuration of the sensor placement determination device. The sensor placement determination device 10 is configured from a display device 11, an input device 12, a central processing unit (CPU) 13, a communication control device 14, an external storage device 15 (storage means), a memory 16, and a bus 17 that connects these devices. The display device 11 is a display or the like, and displays an execution state or an execution result of processing by the sensor placement determination device 10. The input device 12 is a device, such as a keyboard or a mouse, for inputting an instruction to a computer, and inputs an instruction such as startup of a program. The central processing unit (CPU) 13 executes various programs stored in the memory. The communication control device 14 exchanges various data and commands with other devices through a local area network (LAN) 18. The external storage device 15 stores various data for the sensor placement determination device 10 executing processing. The memory 16 stores various programs of which the sensor placement determination device 10 executes processing, and temporal data.

The memory 16 stores processing programs of the traffic simulation observation unit 100, the traffic estimation unit 102, the estimated error calculation unit 104, the additional camera determination unit 106, and a traffic data measurement unit 120 for measuring the traffic data included in the traffic true value data 108. The external storage device 15 stores the traffic true value data 108 and camera installation information 110.

Figure 2:
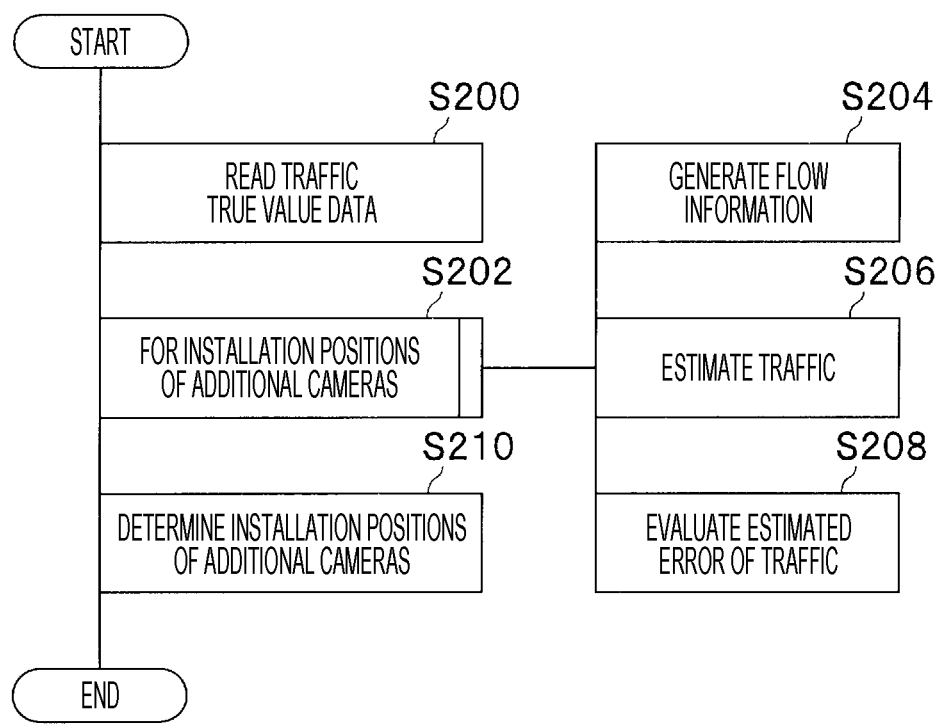
FIG. 2 is a diagram illustrating a processing flow of the entire sensor placement determination device.

FIG. 2 is a diagram illustrating a processing flow of the entire sensor placement determination device. A flow of processing of the sensor placement determination device 10 will be described with reference to FIGS. 1 and 2. Note that the processing flow is illustrated in a problem analysis diagram (PDA) format.

In step S200, the traffic simulation observation unit 100 or the estimated error calculation unit 104 reads the traffic true value data 108 normally stored as a file, on the memory 16 (see FIG. 11).

In step S202, the additional camera determination unit 106 repeats processing of steps S204 to S208 for installation positions of possible virtual additional cameras.

In step S204, the traffic simulation observation unit 100 simulatively generates the flow information of a person occurring when the traffic true value data 108 is observed in the installation positions of the possible additional cameras.

In step S206, the traffic estimation unit 102 estimates the traffic by generating the traffic data that favorably satisfies the occurrence condition of the flow information generated in step S204 by the agent simulation described below.

In step S208, the estimated error calculation unit 104 calculates the estimated error of traffic by comparing the traffic data estimated in step S206 and the traffic true value data 108.

In step S210, the additional camera determination unit 106 selects a condition in which the estimated error of traffic calculated in step S208 is minimized from among the installation positions of various additional cameras determined in step S202, and determines the selected condition as the installation position of the additional camera.

Figure 3:
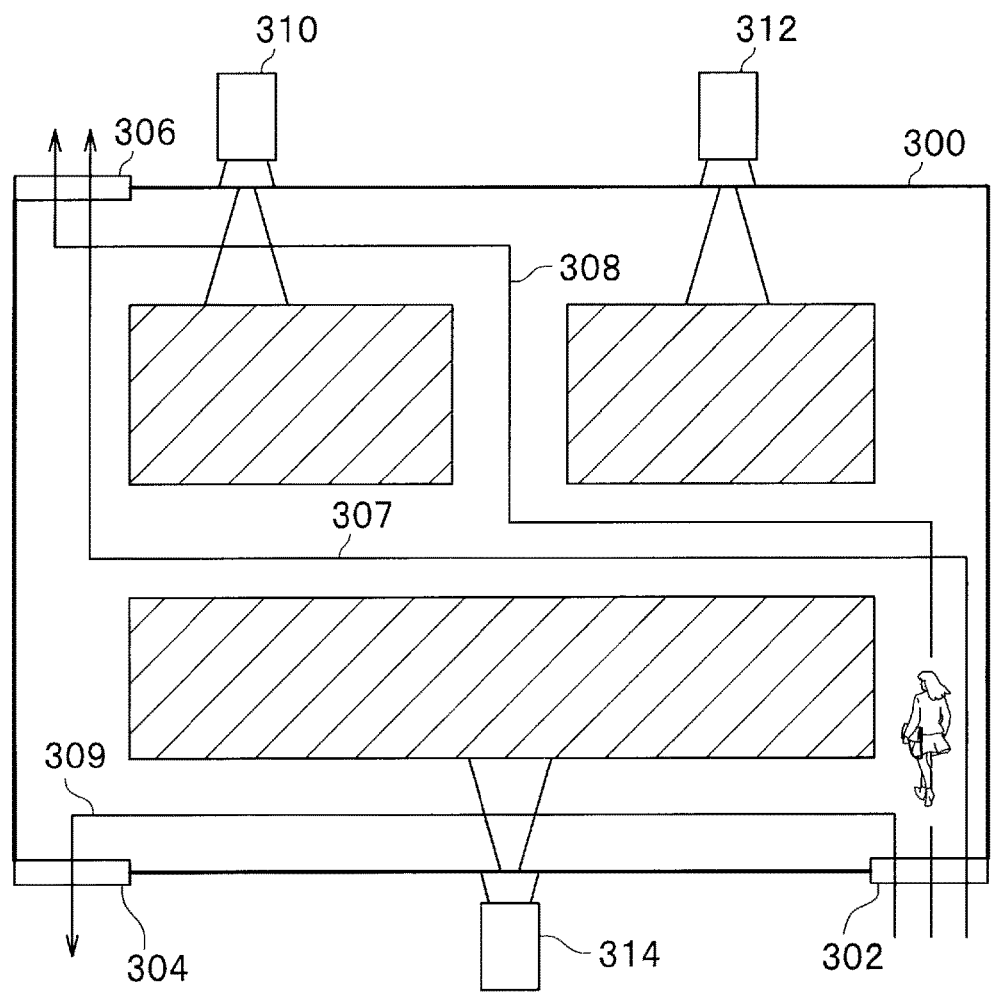
FIG. 3 is a diagram illustrating a use example of the sensor placement determination device.

FIG. 3 is a diagram illustrating a use example of the sensor placement determination device. A use form of the sensor placement determination device 10 will be described with reference to FIG. 3. A target area 300 is an area that becomes a target of the processing of the sensor placement determination device 10, and is a sales floor of a station yard, a department store, a supermarket, or the like. In the target area 300, three doorways 302, 304, and 306 exist. A person enters the target area 300 through any of the doorways, passes through a passage inside the area, and then exits the area 300 through any of the doorways. The path from entering to exiting the area is the traffic data of one person.

For example, a path 307 is a path of one person from entering the area 300 through the doorway 302 to exiting the area 300 through the doorway 306. A path 308 is a path of one person from entering the area 300 through the doorway 302 to exiting the area 300 through the doorway 306. A path 309 is a path of one person from entering the area 300 through the doorway 302 to exiting the area 300 through the doorway 304.

The sensor placement determination device 10 of the present embodiment can determine a position where the estimated error becomes lowest, as a camera position to be added, when the traffic information occurring in the entire target area 300 is estimated with a small number of cameras. For example, as a candidate of the camera position to be added, which camera is most favorable can be evaluated and determined when there are the cameras 310, 312, and 314.

First, a method of creating the traffic true value data 108 necessary for reading the traffic true value data in step S200 of FIG. 2 describe above will be described with reference to FIGS. 12 to 14. It is favorable to investigate the traffic true value data 108 in advance before examination of the additional camera in order to grasp the traffic of the target area 300 that becomes a target of the processing.

Figure 12:
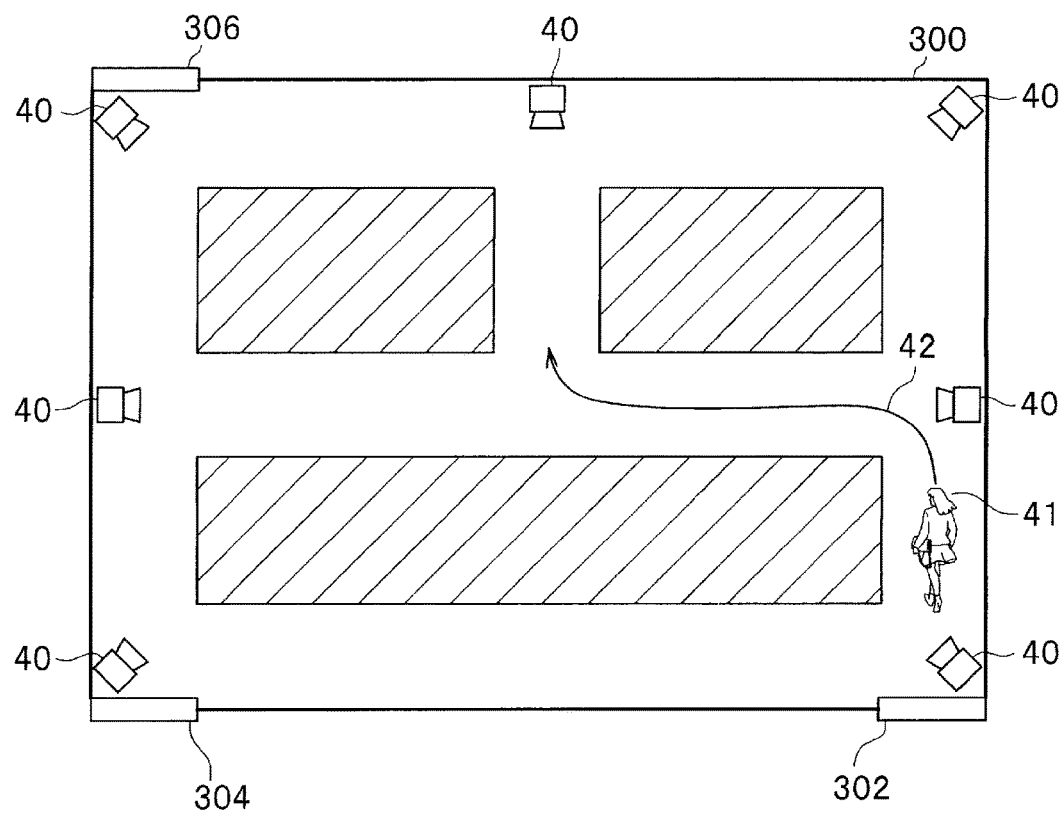
FIG. 12 is a diagram illustrating an example of a method of acquiring traffic data, using a video camera.

FIG. 12 is a diagram illustrating an example of a method of acquiring the traffic data, using video cameras. First, a plurality of video cameras 40 is installed not to cause a place that cannot be captured with the video cameras 40, that is, a blind angle in the target area 300. Note that the video cameras 40 are not installed on a steady basis and are used to acquire the traffic data, and are removed when the traffic data is acquired.

Then, the traffic data measurement unit 120 (see FIG. 11) tracks a person moving in the video by linking the plurality of video cameras 40 connected to a network 18 (see FIG. 11) by image processing. For example, when a person 41 moves along the path 42, the traffic data measurement unit 120 links the plurality of video cameras 40 that captures the person 41, and tracks the person 41 on the video. Here, if an actual position of the person 41 in the target area 300 can be identified from a position of an object captured with the video cameras 40 on the video, the traffic data can be obtained from video information.

Typically, it is difficult to identify a person captured with the video cameras 40 when using image processing. However, when a person to be identified is limited, the person can be identified using a method of collating a customer with a characteristic on a video, as described in Japanese Patent Application Laid-Open No. 2000-200357. In this method, a characteristic of the person to be identified on a video is stored in a database in advance, the characteristic is collated with characteristics of persons on the video captured at the time of measuring the traffic data, and a person with a most matched characteristic is identified.

Figure 13:
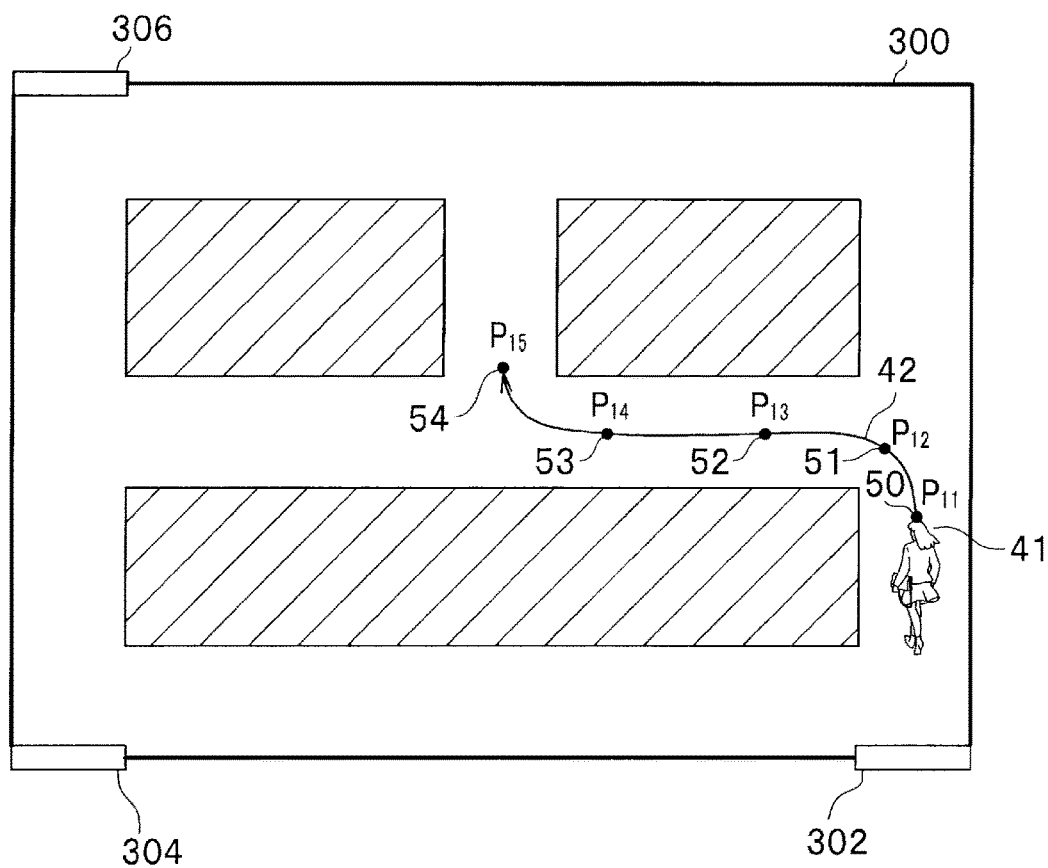
FIG. 13 is a diagram illustrating an example of the traffic data acquired with the video camera.

FIG. 13 is a diagram illustrating an example of the traffic data obtained with the video cameras. An example of the traffic data will be described with reference to FIG. 13. The traffic data measurement unit 120 (see FIG. 11) continuously detects positions of a moving object at certain time intervals. Therefore, when the person has moved, a plurality of continuous points on the path is measured. For example, when the person 41 has moved along the path 42, a sequence of points that serve as elements of the traffic data, that is, a point 50, a point 51, a point 52, a point 53, and a point 54 are measured. Here, the traffic data is approximately expressed with the plurality of sequences of points. To increase accuracy of approximation, a method of making a measurement interval of the traffic data measurement unit 120 dense, a typically used method of expressing a freeform curve, such as spline interpolation, or the like may just be employed.

Figure 14:
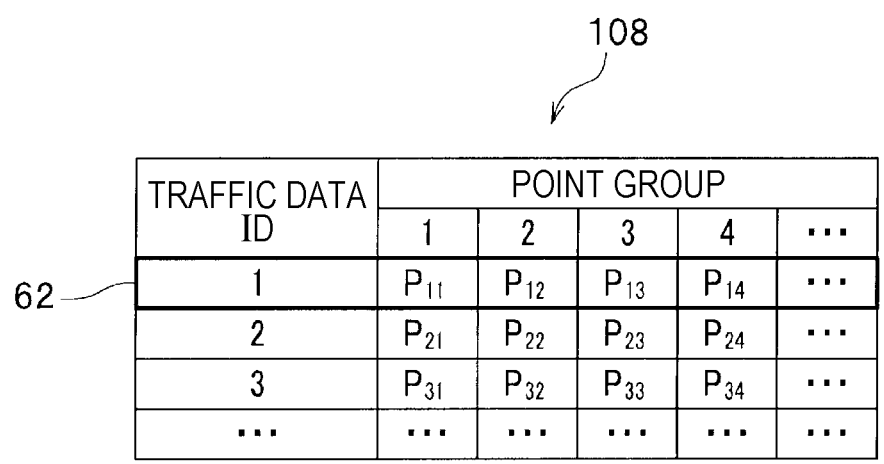
FIG. 14 is a diagram illustrating an example of a data structure of traffic true value data.

FIG. 14 is a diagram illustrating an example of a data structure of the traffic true value data. The traffic true value data 108 is a table in which a plurality of traffic data measured in the traffic data measurement unit 120 is stored. One measured traffic data is stored in each row, that is, a record in the table. A record 62 illustrates an example of storing the traffic data to the path 42. This record includes a traffic data ID that is a unique number for identifying the measured traffic data, and position information of a sequence of points that is a set of points on the traffic data, together with time information when the sequence of points is measured.

Figure 4:
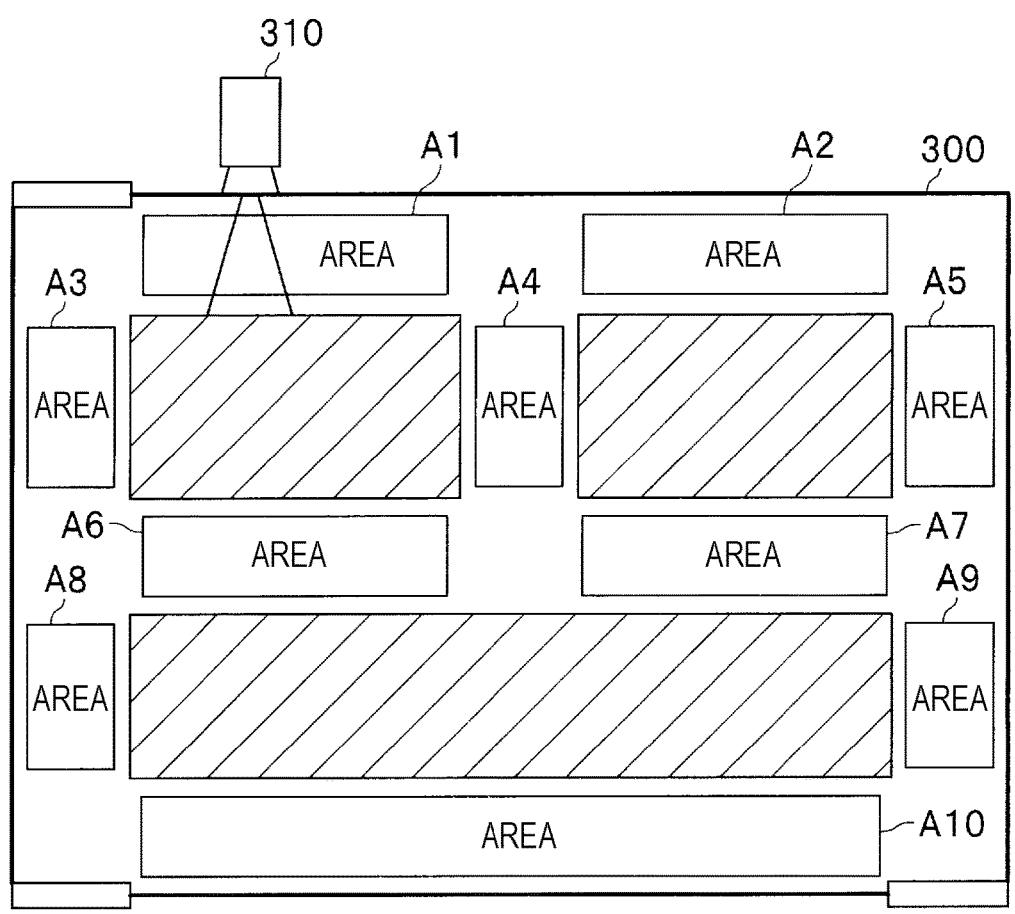
FIG. 4 is a diagram illustrating an installation position of an additional camera.

FIG. 4 is a diagram illustrating the installation positions of the additional cameras. Repeat processing for the installation positions of the additional cameras illustrated in step S202 of FIG. 2 will be described by reference to FIG. 4. Here, the processing of steps S204 to S208 is repeated for the installation positions of the possible additional cameras. As the positions of the possible additional cameras, arbitrary locations where traffic occurs in the target area 300 can be supposed.

However, in this case, there is a problem that the number of the repetition processing becomes large and thus a processing time becomes longer. Therefore, to reduce the processing time, limiting the number of candidate areas is considered. For example, when a passage portion with no divergence is considered as one area, areas A1 to A10 are target areas. Even if which area the camera is placed within the areas, a flow to measure the area is the same. This is because no generation or disappearance of the traffic occurs within the area. Therefore, when considering a candidate position of the camera in an arbitrary place within each area, no further candidate position needs to be considered in other places within the area. Therefore, one place such as the center of gravity is considered as the candidate position of the camera for each of all areas. Note that the candidate of the installation position of the additional camera may be able to be directly identified through a screen by a user of the sensor placement determination device 10, using the mouse and the like of the input device 12 (see FIG. 11).

<Traffic Simulation Observation Unit>

Figure 5:
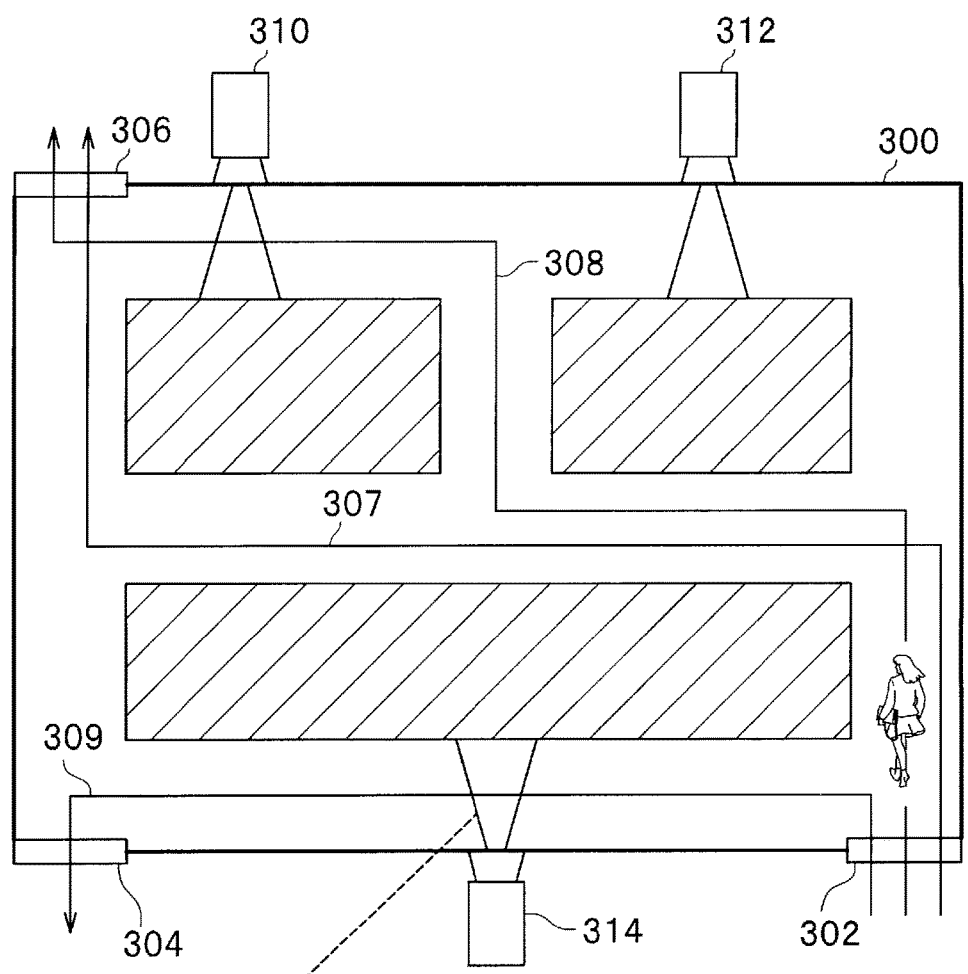
FIG. 5 is a diagram illustrating an example of generation of flow information of a traffic simulation observation unit.

FIG. 5 is a diagram illustrating an example of generation of the flow information of the traffic simulation observation unit. Generation of the flow information illustrated in step S204 of FIG. 2 will be described with reference to FIG. 5. The traffic simulation observation unit 100 simulatively generates passage information of a person occurring when performing observation, that is, the flow information, for the installation position of the additional camera in step S202, based on the traffic true value data 108.

Here, the path 309 is a path entering the area through the doorway 302 and exiting the area through the doorway 304. The traffic simulation observation unit 100 generates the flow information 502 as a result of measurement with the virtually installed camera 314. In the flow information 502, the number of people passing a field of view of the camera 314 is held for each predetermined time section.

The traffic true value data 108 (see FIG. 14) includes, as already described, the position information of the sequence of points that is a set of points on the traffic data, together with the time information when the sequence of points is measured, for each traffic data ID. Therefore, the traffic simulation observation unit 100 can count the number of people passing through the field of view captured with the camera 314 in every predetermined time. To be specific, in the flow information 502, the number of people passing from the doorway 302 side to the doorway 304 side on the path 309 is 20 from 8:00 to 8:10. Further, the number of people passing from the doorway 302 side to the doorway 304 side on the path 309 is 15 from 8:10 to 8:20. The traffic simulation observation unit 100 can generate the flow information that varies from time to time.

<Traffic Estimation Unit>

Figure 6:
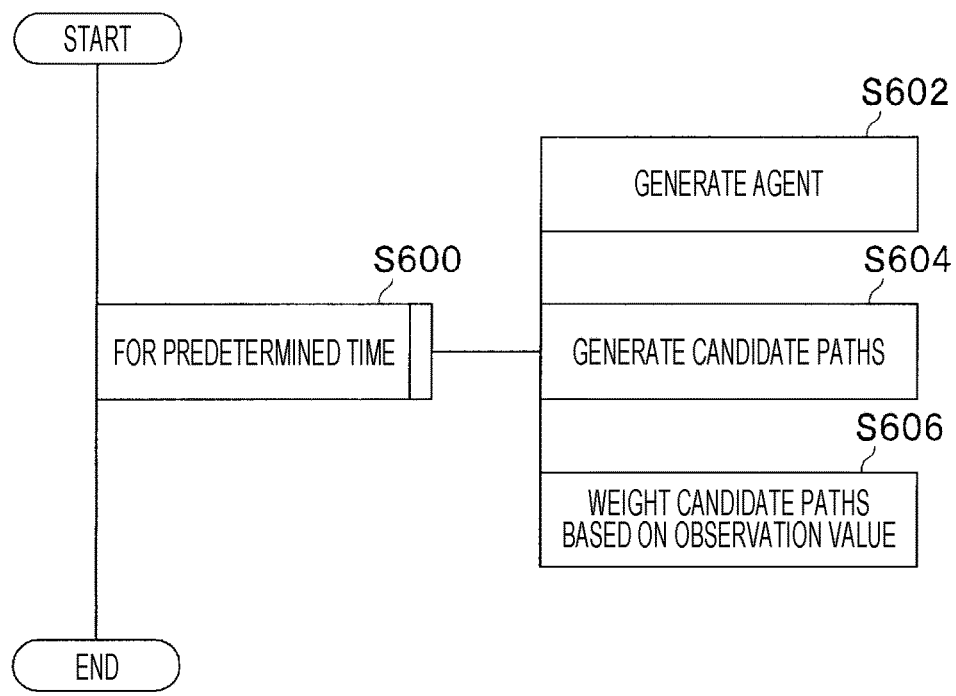
FIG. 6 is a diagram illustrating a processing flow of processing of estimating traffic by a traffic estimation unit.

FIG. 6 is a diagram illustrating a processing flow of processing of estimating traffic by the traffic estimation unit. Processing of estimating traffic illustrated in step S206 of FIG. 2 will be described with reference to FIG. 6. The traffic estimation unit 102 generates traffic data that favorably satisfies the occurrence condition of the flow information 502 generated in step S204, by multi-agent simulation.

The multi-agent simulation is a simulation technique for analyzing social behavior appearing by causing a plurality of agents (subjects of an action, here, persons) to which rules are provided in advance to execute the respective rules in a simultaneous manner, and causing the agents to interact with each other. A technique described in NPL 1 may just be used for estimation of the traffic using the multi-agent simulation. Hereinafter, an outline of this technique will be described.

The traffic estimation unit 102 repeats the processing of steps S602 to S606 for a predetermined time of step S600. The predetermined time is a collection time of the traffic true value data 108. For example, when the collection time of the traffic true value data 108 is 30 minutes and a collection interval of data is 1/10 seconds, the traffic estimation unit 102 repeats the processing of step S600 for 30 minutes at 1/10 second intervals.

In step S602, the traffic estimation unit 102 generates the agent when a person entering the target area 300 (see FIG. 3) exists in the traffic true value data 108, in a current simulation time.

In step S604, the traffic estimation unit 102 generates a plurality of candidate paths, using a walker model, for the agent. The walker model is a rule related to movement of the agent. As this rule, a potential model for selecting a route based on a moving cost to a destination may just be used, for example. The potential model is a technique, in consideration of a potential surface of the moving cost from an arbitrary point to the destination, to move a person in a direction into which an incline of the potential surface is large. Here, as the moving cost, a time required for movement and the like can be considered. The traffic estimation unit 102 generates the candidate paths for the plurality of doorways of the target area 300 from a spot entering the target area 300, using the walk model.

In step S606, the traffic estimation unit 102 selects the candidate path that is matched with an observation value by performing evaluation and weighting by a data assimilation technique and the observation value. As the data assimilation technique, a technique using a particle filter described in NPL 1 may be used. The particle filter is a type of Bayes filter. The Bayes filter is a technique to estimate a state by sequentially repeating time update to predict a state of a next time and observation update to update the predicted state, using observation information obtained with a sensor, based on the Bayes' theorem. This estimated state is expressed by a probability density function. Further, the particle filter is a technique to obtain an approximate solution of the probability density function by Monte Carlo approach.

The traffic estimation unit 102 adjusts the weight of the candidate path to make the flow information generated in the additional camera obtained in step S204 (see FIG. 2), and the flow information generated in the same place (for example, the observation position with the camera 314 illustrated in FIG. 5) with the candidate path (particle) generated in step S604 as close as possible, using the particle filter.

Next, a procedure of the processing of adjusting the weight of the candidate path (particle) will be described. First, when a plurality of candidate paths (particles) is provided to the agent generated in step S602, the weights of the respective candidate paths are adjusted.

When the number of the candidate paths is n, an initial value $W_0(i)$ of the weight of the i-th candidate path (particle) is 1/n. When the flow information observed at a time t is $m_t$, the weight $W_t(i)$ of the i-th particle is updated with the formula (1), so that the weight $W_{t+1}(i)$ of the time t+1 is obtained. By repetition of the update, the weight of the candidate path that satisfies a constraining condition of the flow information can be obtained.

[Mathematical Formula 1]

$$w_{t+1}(i) = \frac{m_t}{\sum_j w_t(j)} \times w_t(i) \qquad \text{Formula (1)}$$

A result of the weighting such that the target candidate path can be matched with the observation value is estimated path data. A specific example will be described with reference to FIG. 7.

Figure 7:
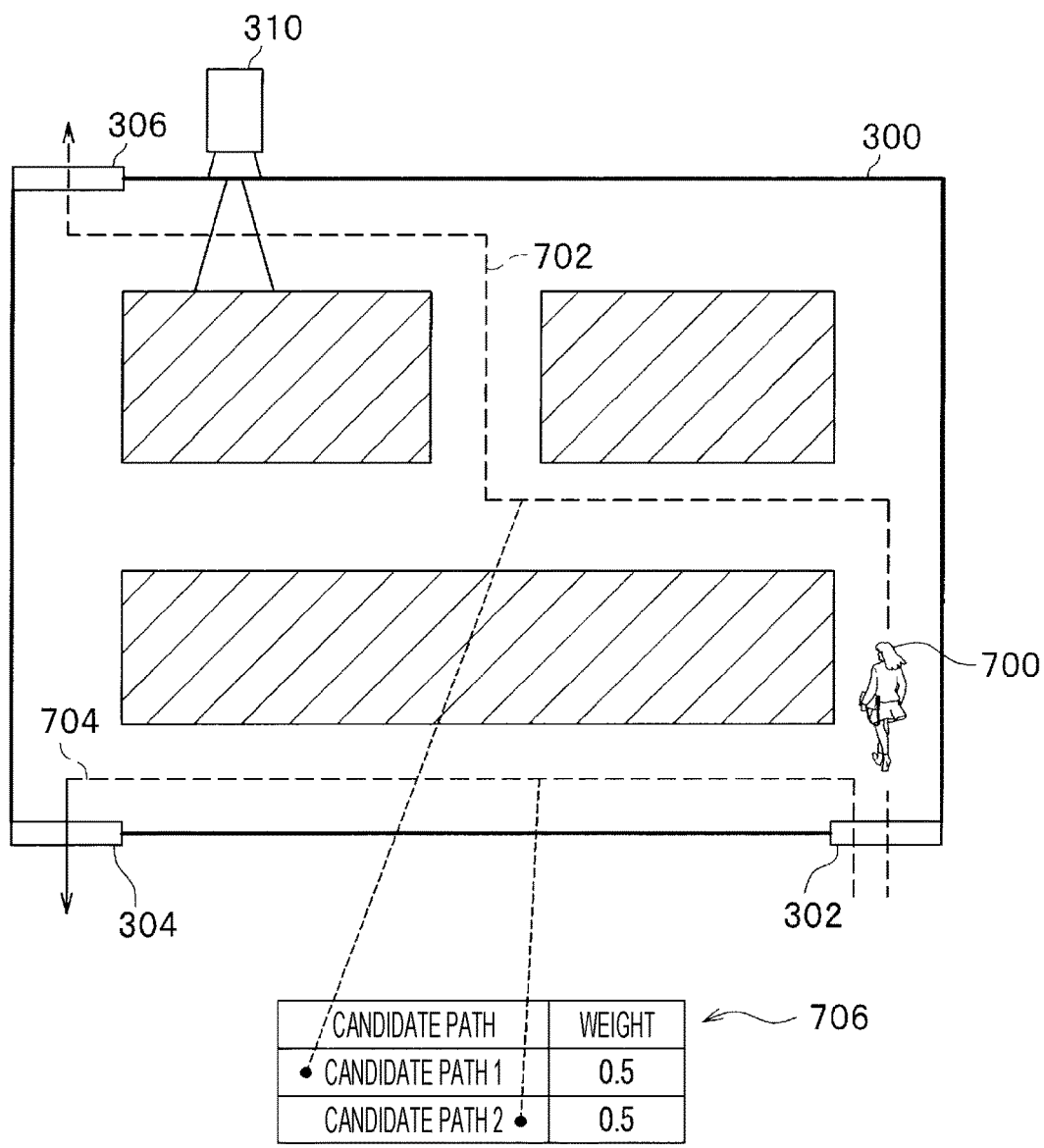
FIG. 7 is a diagram illustrating an example of processing of generating a candidate path.

FIG. 7 is a diagram illustrating an example of processing of generating the candidate path. A specific example of the processing of generating the candidate path of step S604 of FIG. 6 will be described with reference to FIG. 7. The traffic estimation unit 102 generates two candidate paths including a candidate path 702 and a candidate path 704 for a person 700 who has entered the area 300 through the doorway 302.

The candidate path 702 is a path having the doorway 302 as a starting point and the doorway 306 as an end point. Further, the candidate path 704 is a path having the doorway 302 as a starting point and the doorway 304 as an end point. As the end points, all of the doorways may be selected, or a doorway may be selected based on a probability determined in advance. The traffic estimation unit 102 generates the candidate path from the starting point to the end point by simulation using the above-described potential model after determining the starting point and the end point. 0.5 that is a reciprocal of a candidate path number 2 is set to the generated candidate path, as an initial value of the weight, as illustrated in a table 706. Then, after repetitive calculation, the weight of the candidate path 702 becomes 0.9, and the weight of the candidate path 704 becomes 0.1, for example. That is, the person 700 is estimated to flow as 0.9 persons in the candidate path 704, and 0.1 persons in the candidate path 702.

Note that the candidate paths 702 and 704 illustrated in FIG. 7 are moving routes generated by the traffic estimation unit 102 as the candidates when a moving route of one person from entering the target area 300 to exiting the target area 300 is estimated by simulation. In contrast, the paths 307 to 309 illustrated in FIG. 5 are moving routes along which the person actually has moved. Note that the paths 307 to 309 are actual paths as against the estimated candidate paths 702 and 704.

<Estimated Error Calculation Unit>

Figure 8:
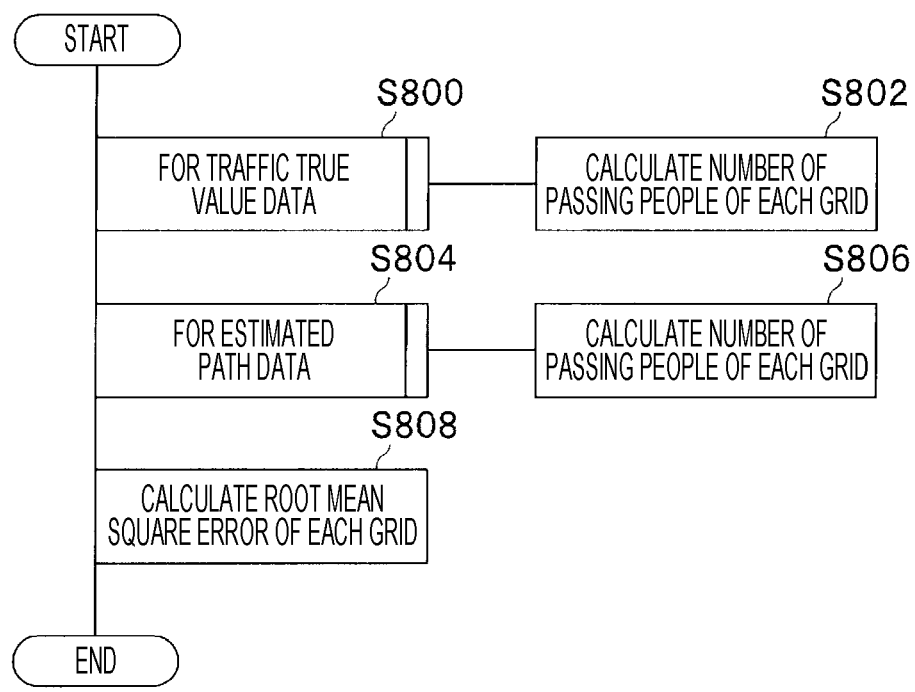
FIG. 8 is a diagram illustrating a processing flow of evaluating an estimated error of traffic by an estimated error calculation unit.

FIG. 8 is a diagram illustrating a processing flow of evaluating the estimated error of traffic by the estimated error calculation unit. The processing of evaluating the estimated error of traffic illustrated in step S208 of FIG. 2 will be described with reference to FIG. 8. The estimated error calculation unit 104 compares the path data estimated in step S206 and the path of the traffic data of the traffic true value data 108 and calculates the estimated error.

In step S800, the estimated error calculation unit 104 repeats processing of step S802 for all of the traffic data IDs (see FIG. 14) included in the traffic true value data 108. In step S802, the estimated error calculation unit 104 calculates the number of people passing of each grid, for the path indicated by a point group, for each of the traffic data IDs that are targets of the processing. A specific example of the number of people passing of each grid will be described with reference to FIG. 9.

Figure 9:
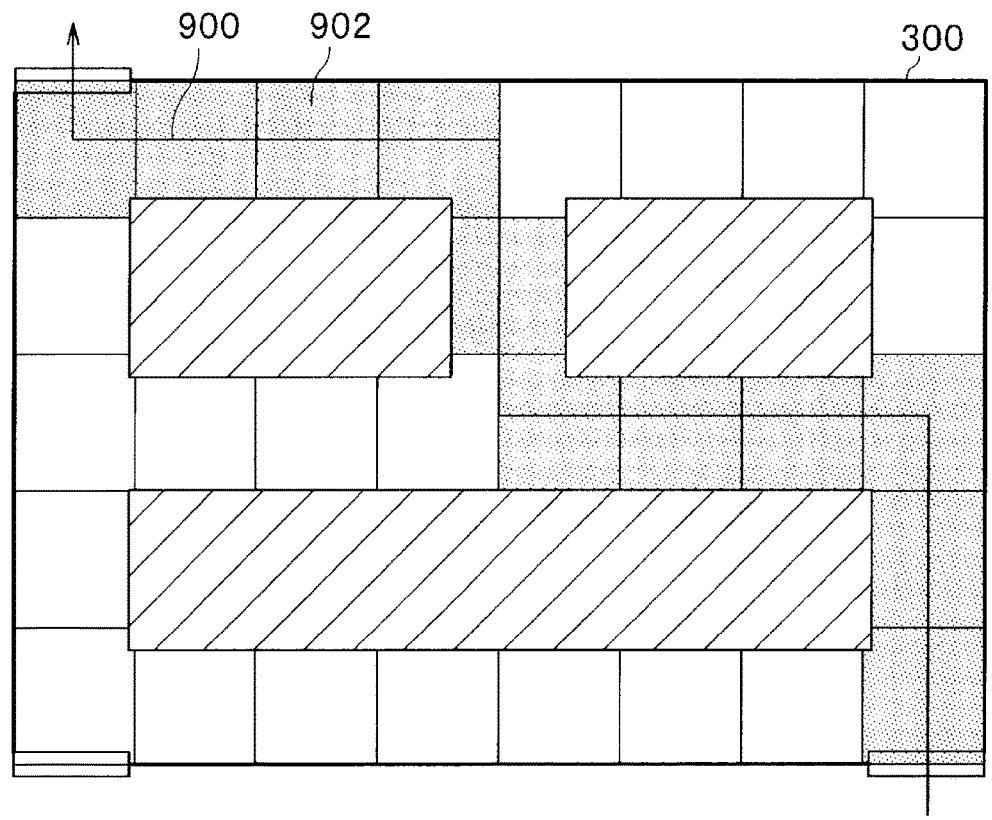
FIG. 9 is a diagram illustrating an example of processing of counting the number of people passing of each grid.

FIG. 9 is a diagram illustrating an example of processing of counting the number of people passing of each grid. A specific example of processing of calculating the number of people passing of each grid illustrated in steps S802 and S806 of FIG. 8 will be described with reference to FIG. 9. First, the target area 300 is divided in a grid manner by the number of divisions determined in advance, and each grid is caused to hold the information of the number of people passing. Then, when there is a path 900 as a target of the processing, the number of people passing of a grid 902 is increased by one. By similarly performing processing all of paths that are the targets of processing, a final calculation result of the number of people passing of each grid can be obtained.

Referring back to FIG. 8, in step S802, the estimated error calculation unit 104 calculates a cumulative number of paths that pass through each grid when the target area 300 is divided into some grids.

In step S804, the estimated error calculation unit 104 repeats processing of step S806 for all of path data estimated in step S206. In step S806, the estimated error calculation unit 104 calculates the number of people passing of each grid, for the path data that is the target of processing, similarly to step S802.

In step S808, the estimated error calculation unit 104 calculate an error by comparing the number of people passing for the traffic true value data 108 and the number of people for the path data estimated in step S206, for each grid. Here, a root mean square error is used as the error. This root mean square error RMSE is expressed by the formula (2). Here, n is the number of grids, $r_i$ is the number of people passing of the traffic true value data 108 for the i-th grid, $e_i$ is the number of people passing of the path data estimated for the i-th grid.

[Mathematical Formula 2]

$$RMSE = \sqrt{\frac{\sum_{i=1}^{n}(r_i - e_i)^2}{n}} \qquad \text{Formula (2)}$$

<Additional Camera Determination Unit>

Figure 10:
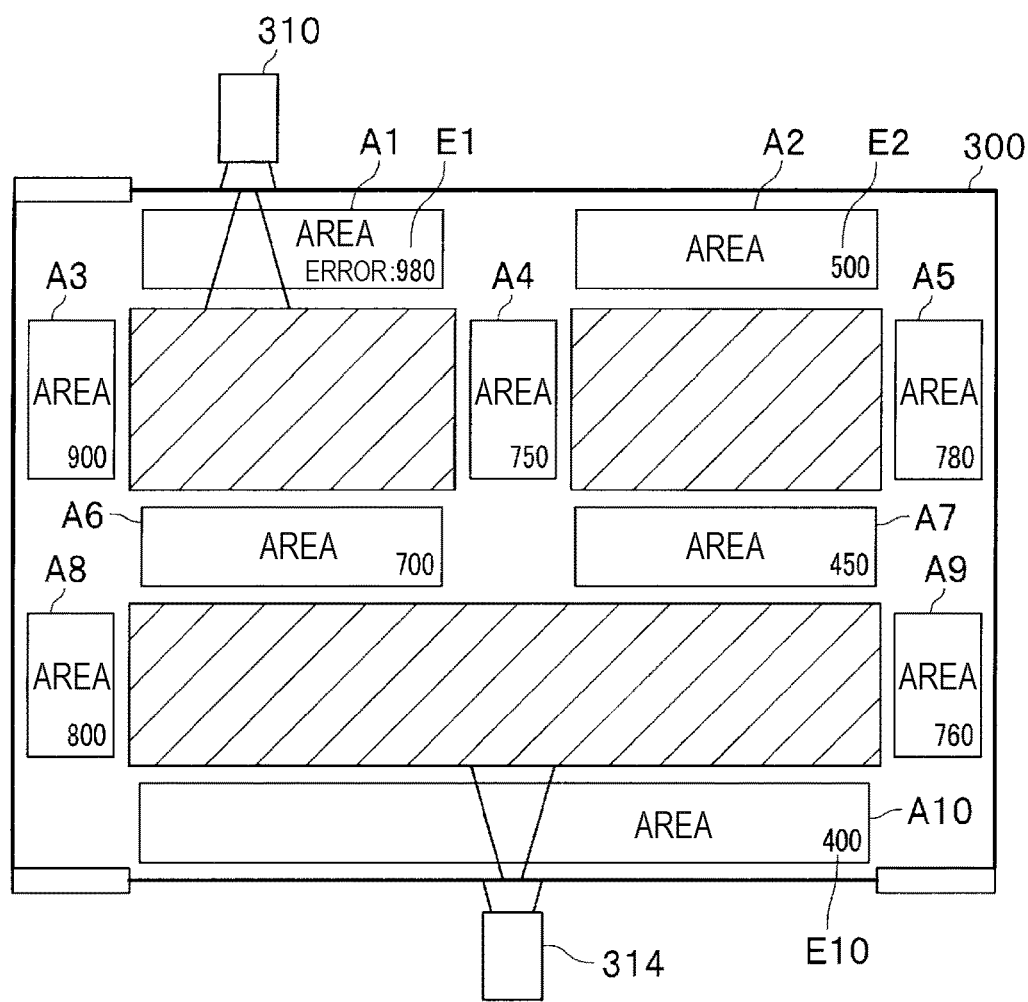
FIG. 10 is a diagram illustrating an example of processing of determining an installation position of an additional camera in a target area.

FIG. 10 is a diagram illustrating an example of processing of determining the installation position of the additional camera in the target area. A specific example of processing of determining the installation position of the additional camera illustrated in step S210 of FIG. 2 in the target area 300 will be described with reference to FIG. 10, using a case of first adding the camera to the target area 300. Numerical values illustrated in the lower right of the candidate areas (the areas A1 to A10) of the installation positions of the additional camera are the root mean square errors RMSE calculated in step S208.

For example, an error E1 of when a camera is added to the area A1 corresponding to a camera 310 is 980. Similarly, an error E2 of when a camera is added to the area A2 is 500. In step S210, the additional camera determination unit 106 compares the errors calculated for the respective areas and determines an area with the smallest error, and displays a placement position of a sensor determined on the target area 300 illustrated in FIG. 10, in the display device 11 (see FIG. 11).

In the case of FIG. 10, an error E10 of the area A10, which is 400, is the smallest. Therefore, the camera 314 corresponding to the area A10 can be determined as the installation position of the additional camera. Note that the installation position can be similarly determined even in a case of newly adding one camera to the target area 300 on the basis that two cameras have already been installed in the target area 300, for example.

The sensor placement determination device 10 of the present embodiment includes the storage means (for example, the external storage device 15) in which the traffic data that is the actual path of the person in the target area 300 where the sensor (for example, the camera 314) for measuring traffic is to be placed is stored, the traffic simulation measurement means (for example, the traffic simulation observation unit 100) that generates the passage information of the person in the area observed with the sensor, based on the traffic data, in the candidates of the placement positions of the sensor in the target area 300, the traffic estimation means (for example, the traffic estimation unit 102) that generates the candidate path that indicates how the person passes through the target area, using the passage information as the constraining condition, the estimated error calculation means (for example, the estimated error calculation unit 104) that calculates the estimated error of traffic between the number of people passing in the candidate path, who pass through the area observed with the sensor and the number of people passing in the actual path, and the sensor position determination means (for example, the additional camera determination unit 106) that determines the position where the calculated estimated error of traffic becomes small, as the placement position of the sensor.

The sensor placement determination device 10 of the present embodiment can quantitatively evaluate good and bad of the placement positions (installation positions) of the cameras in terms of traffic measurement. Accordingly, the optimum placement positions of when the traffic is measured with a small number of cameras can be determined.

REFERENCE SIGNS LIST 10 sensor placement determination device
11 display device
12 input device
13 central processing unit (CPU)
14 communication control device
15 external storage device (storage means)
16 memory
40 video camera
41 person
62 record
100 traffic simulation observation unit (traffic simulation measurement means)
102 traffic estimation unit (traffic estimation means)
104 estimated error calculation unit (estimated error calculation means)
106 additional camera determination unit (sensor position determination means)
108 traffic true value data
110 camera installation information
120 traffic data measurement unit
302, 304, and 306 doorway
310, 312, and 314 camera
307, 308, and 309 path (actual path)
502 flow information (passage information)
702 and 704 candidate path
706 table
902 grid
RMSE root mean square error

The invention claimed is:

1. A sensor placement determination device comprising:
   storage means configured to store, about a target area where a plurality of sensors that observes traffic is to be placed, traffic data that is an actual path of when a person actually passes through the target area;
   traffic simulation measurement means configured to simulatively generate observation information of the person observed with each of the sensors, when the plurality of sensors is placed, based on the traffic data, in candidates of placement positions of the plurality of sensors in the target area;
   traffic estimation means configured to estimate and generate a candidate path indicating how the person passes through the target area, using the observation information generated by the traffic simulation measurement means as a constraining condition;
   estimated error calculation means configured to compare a first number of observed people of each candidate of the placement positions of the sensors calculated based on the candidate path generated by the traffic estimation means and a second number of observed people of each candidate of the placement positions of the sensors calculated based on the traffic data, and calculate an estimated error of when the traffic estimation means estimates the candidate path based on a comparison between the first number and the second number; and
   sensor position determination means configured to select the candidate as the placement position of the sensor where the estimated error calculated by the estimated error calculation means is minimized for the candidates of the placement positions of the plurality of sensors, and determines the placement position.

2. The sensor placement determination device according to claim 1, wherein
   the traffic estimation means generates the candidate path by multi-agent simulation.

3. The sensor placement determination device according to claim 2, wherein
   the traffic estimation means generates the candidate path matched with an observation value that is the observation information of the person observed with each of the sensors by a data assimilation technique, by weighting the candidate path with the observation value.

4. The sensor placement determination device according to claim 3, wherein
   the estimated error calculation means calculates the number of observed people for each area of the candidates of the placement positions of the sensors, of the target area, and uses a root mean square error of the number of people of each area, as the estimated error.

5. The sensor placement determination device according to claim 1, wherein
   the sensor is at least one of a camera, a line sensor, and a laser scanner.

6. The sensor placement determination device according to claim 1, wherein
   the sensor placement determination means selects the candidate of the placement position of the sensor for each passage portion where divergence does not exist.

7. The sensor placement determination device according to claim 1, wherein
   the sensor placement determination means displays the target area and the determined placement position of the sensor in a display device.

8. A sensor placement determination method of adding a sensor in a target area, using a sensor placement determination device including a storage means that stores, about the target area where a plurality of sensors that measures traffic is to be placed, traffic data that is an actual path of when a person actually passes through the target area, traffic simulation measurement means, traffic estimation means, estimated error calculation means, and sensor position determination means, the method comprising:
   simulatively generating, by the traffic simulation measurement means, observation information of the person observed with each of the sensors, when the plurality of sensors is placed, based on the traffic data, in candidates of placement positions of the plurality of sensors in the target area;
   estimating and generating, by the traffic estimation means, a candidate path indicating how the person passes through the target area, using the observation information generated by the traffic simulation measurement means as a constraining condition;
   comparing, by the estimated error calculation means a first number of observed people of each candidate of the placement positions of the sensors calculated based on the candidate path generated by the traffic estimation means and a second number of observed people of each candidate of the placement positions of the sensors calculated based on the traffic data, and calculating an estimated error of when the traffic estimation means estimates the candidate path based on a comparison between the first number and the second number; and
   selecting, by the sensor position determination means, the candidate as the placement position of the sensor where the estimated error calculated by the estimated error calculation means is minimized for the candidates of the placement positions of the plurality of sensors, and determining the placement position.

* * * * *